(12) United States Patent
Loehr et al.

(10) Patent No.: US 10,484,908 B2
(45) Date of Patent: Nov. 19, 2019

(54) INDICATION FOR A TRANSPORT BLOCK

(71) Applicant: Motorola Mobility LLC, Chicago, IL (US)

(72) Inventors: Joachim Loehr, Wiesbaden (DE); Prateek Basu Mallick, Langen (DE); Ravi Kuchibhotla, Clarendon Hills, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/584,988

(22) Filed: May 2, 2017

(65) Prior Publication Data

US 2018/0324639 A1  Nov. 8, 2018

(51) Int. Cl.
| | |
|---|---|
| *H04W 28/06* | (2009.01) |
| *H04L 1/00* | (2006.01) |
| *H04W 28/02* | (2009.01) |
| *H04L 12/805* | (2013.01) |

(52) U.S. Cl.
CPC .......... *H04W 28/06* (2013.01); *H04L 1/0083* (2013.01); *H04L 47/36* (2013.01); *H04W 28/0289* (2013.01)

(58) Field of Classification Search
CPC .. H04W 28/06; H04W 28/0289; H04L 47/36; H04L 1/0083
See application file for complete search history.

(56) References Cited

U.S. PATENT DOCUMENTS

| | | | | |
|---|---|---|---|---|
| 2014/0023010 A1* | 1/2014 | Loehr | ................. | H04W 52/365 370/329 |
| 2015/0163695 A1* | 6/2015 | Li | ........................ | H04W 12/06 370/328 |
| 2017/0055248 A1* | 2/2017 | Moon | .................... | H04L 1/1812 |
| 2018/0049046 A1* | 2/2018 | Lunttila | ................ | H04W 24/02 |
| 2018/0103395 A1* | 4/2018 | Gholmieh | ........... | H04W 28/065 |

FOREIGN PATENT DOCUMENTS

WO  2016064221 A1  4/2016

OTHER PUBLICATIONS

R2-1702597, "MAC PDU Format", Huawei, HiSilicon, 3GPP TSG-RAN WG2 #97bis, Spokane, Washington, USA, Apr. 3-7, 2017 (Year: 2017).*
PCT/US2018/030690, "Notification of Transmittal of the International Search Report and the Written Opinion of the International Searching Authority, or the Declaration", International Searching Authority, dated Aug. 2, 2018, pp. 1-12.
Samsung, "MAC PDU structure in NR", 3GPP TSG-RAN WG2 Meeting #97bis, R2-1703574, Apr. 3-7, 2017, pp. 1-4.
Panasonic, "MAC PDU Structure for NR", 3GPP TSG-RAN WG2 Meeting #96, R2-167796, Nov. 14-18, 2016, pp. 1-2.

* cited by examiner

*Primary Examiner* — Kwang B Yao
*Assistant Examiner* — Moo Jeong
(74) *Attorney, Agent, or Firm* — Kunzler Bean & Adamson

(57) ABSTRACT

Apparatuses, methods, and systems are transmitting and/or receiving an indication for a transport block. One apparatus includes a processor that determines whether a size of a transport block is greater than a predetermined threshold. The apparatus includes a transmitter that, in response to the size of the transport block being greater than the predetermined threshold, transmits an indication that identifies whether a medium access control control element is at an end of the transport block.

17 Claims, 8 Drawing Sheets

INDICATION FOR A TRANSPORT BLOCK

FIELD

The subject matter disclosed herein relates generally to wireless communications and more particularly relates to an indication for a transport block.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Control Element ("CE"), Cyclic Prefix ("CP"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Medium Access Control ("MAC"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Reference Signal ("RS"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TBS"), Time-Division Duplex ("TDD"), Time Division Multiplex ("TDM"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, MAC CEs may be placed at an end of a transport block. In such configurations, a receiver of the MAC CEs may not know that the MAC CEs are placed at the end of the transport block.

BRIEF SUMMARY

Apparatuses for transmitting and/or receiving an indication for a transport block are disclosed. Methods and systems also perform the functions of the apparatus. In one embodiment, the apparatus includes a processor that determines whether a size of a transport block is greater than a predetermined threshold. In certain embodiments, the apparatus includes a transmitter that, in response to the size of the transport block being greater than the predetermined threshold, transmits an indication that identifies whether a medium access control control element is at an end of the transport block.

In one embodiment, the transport block includes a medium access control protocol data unit. In certain embodiments, the indication identifies a location in the transport block. In various embodiments, the location is a beginning location of medium access control control elements. In some embodiments, the beginning location of medium access control control elements is positioned after medium access control service data units in the transport block.

In certain embodiments, the apparatus includes a receiver that receives a message indicating the predetermined threshold. In some embodiments, the message is a system information message. In various embodiments, the predetermined threshold is determined based on a specification. In one embodiment, the transmitter transmits the indication at a beginning of the transport block. In certain embodiments, the transmitter transmits the indication at an end of the transport block. In some embodiments, medium access control subheaders are positioned before medium access control control elements in the transport block. In various embodiments, medium access control subheaders are positioned after medium access control control elements in the transport block.

In one embodiment, the transmitter, in response to the size of the transport block being less than the predetermined threshold, does not transmit the indication. In certain embodiments, medium access control headers include a length field that indicates a length of information corresponding to a respective medium access control subheader. In various embodiments, a length of padding is not indicated by a corresponding medium access control subheader. In some embodiments, the transport block includes padding between medium access control service data units and medium access control control elements.

A method for transmitting an indication for a transport block, in one embodiment, includes determining whether a size of a transport block is greater than a predetermined threshold. In various embodiments, the method includes transmitting, in response to the size of the transport block being greater than the predetermined threshold, an indication that identifies whether a medium access control control element is at an end of the transport block.

In one embodiment, an apparatus includes a receiver that, in response to a size of a transport block being greater than a predetermined threshold, receives an indication that identifies whether a medium access control control element is at an end of the transport block.

In one embodiment, the transport block includes a medium access control protocol data unit. In certain embodiments, the indication identifies a location in the transport block. In various embodiments, the location is a beginning location of medium access control control elements. In some embodiments, the beginning location of medium access control control elements is positioned after medium access control service data units in the transport block.

In certain embodiments, the apparatus includes a transmitter that transmits a message indicating the predetermined threshold. In some embodiments, the message is a system information message. In various embodiments, the predetermined threshold is determined based on a specification. In one embodiment, the receiver receives the indication at a beginning of the transport block. In certain embodiments, the receiver receives the indication at an end of the transport block. In some embodiments, medium access control subheaders are positioned before medium access control control elements in the transport block. In various embodiments, medium access control subheaders are positioned after medium access control control elements in the transport block.

In one embodiment, the receiver, in response to the size of the transport block being less than the predetermined threshold, does not receive the indication. In certain embodiments, medium access control headers include a length field that indicates a length of information corresponding to a respective medium access control subheader. In various embodiments, a length of padding is not indicated by a corresponding medium access control subheader. In some embodiments, the transport block includes padding between medium access control service data units and medium access control control elements.

A method for receiving an indication for a transport block, in one embodiment, includes receiving, in response to a size of a transport block being greater than a predetermined threshold, an indication that identifies whether a medium access control control element is at an end of the transport block.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
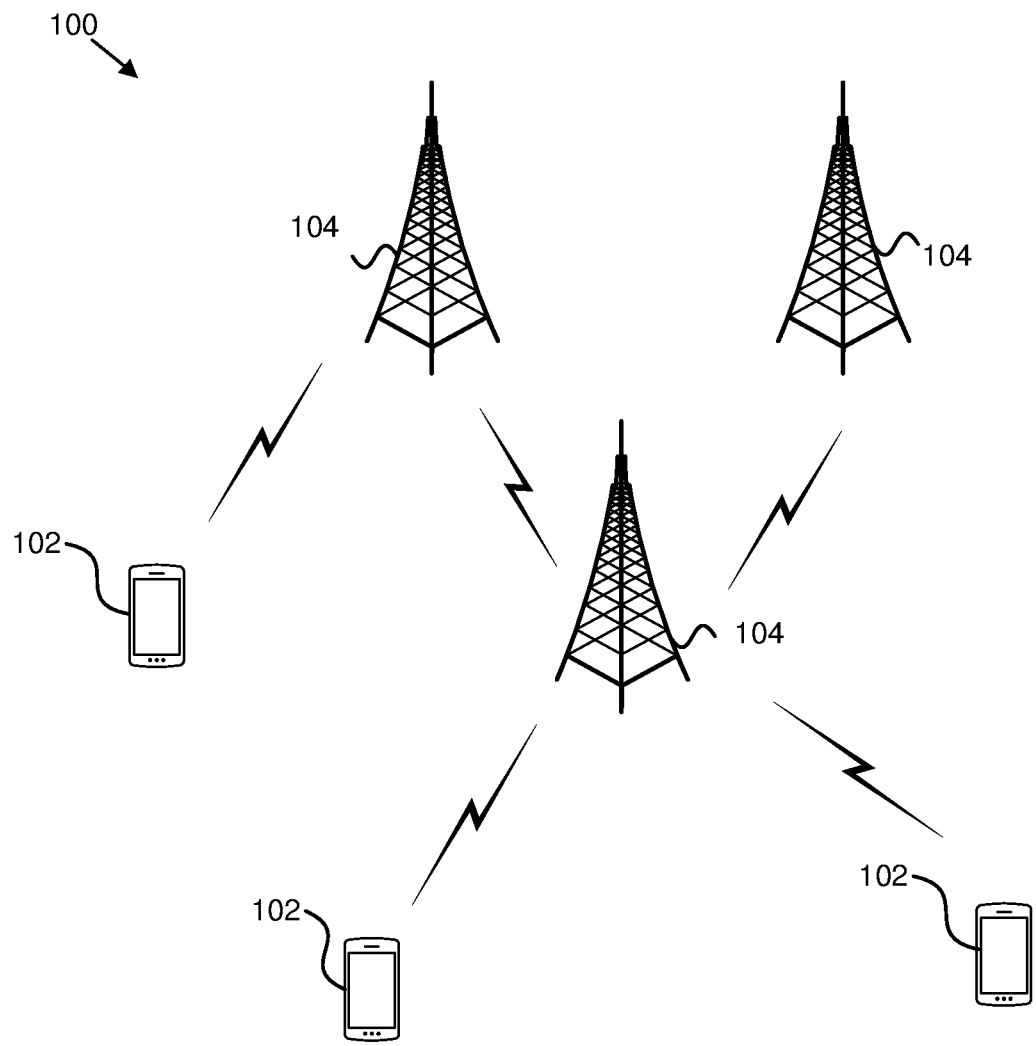
FIG. 1 is a schematic block diagram illustrating one embodiment of a wireless communication system for transmitting and/or receiving an indication for a transport block.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit including custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for transmitting and/or receiving an indication for a transport block. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the LTE protocols standardized in 3GPP, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a remote unit 102 may determine whether a size of a transport block is greater than a predetermined threshold. In various embodiments, the remote unit 102 may transmit, in response to the size of the transport block being greater than the predetermined threshold, an indication that identifies whether a medium access control control element is at an end of the transport block. Accordingly, a remote unit 102 may be used for transmitting an indication for a transport block.

In another embodiment, a base unit 104 may receive, in response to a size of a transport block being greater than a predetermined threshold, an indication that identifies whether a medium access control control element is at an end of the transport block. Accordingly, a base unit 104 may be used for receiving an indication for a transport block.

Figure 2:
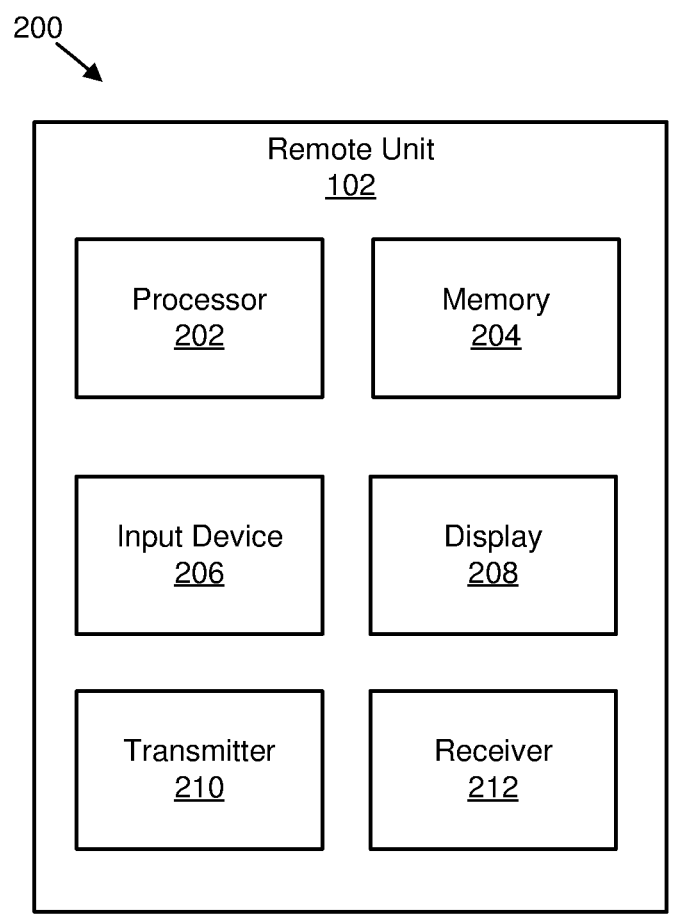
FIG. 2 is a schematic block diagram illustrating one embodiment of an apparatus that may be used for transmitting an indication for a transport block.

FIG. 2 depicts one embodiment of an apparatus 200 that may be used for transmitting an indication for a transport block. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 determines whether a size of a transport block is greater than a predetermined threshold. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to transport blocks. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In various embodiments, the transmitter 210 may be used to transmit, in response to the size of a transport block being greater than a predetermined threshold, an indication that identifies whether a medium access control control element is at an end of the transport block. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
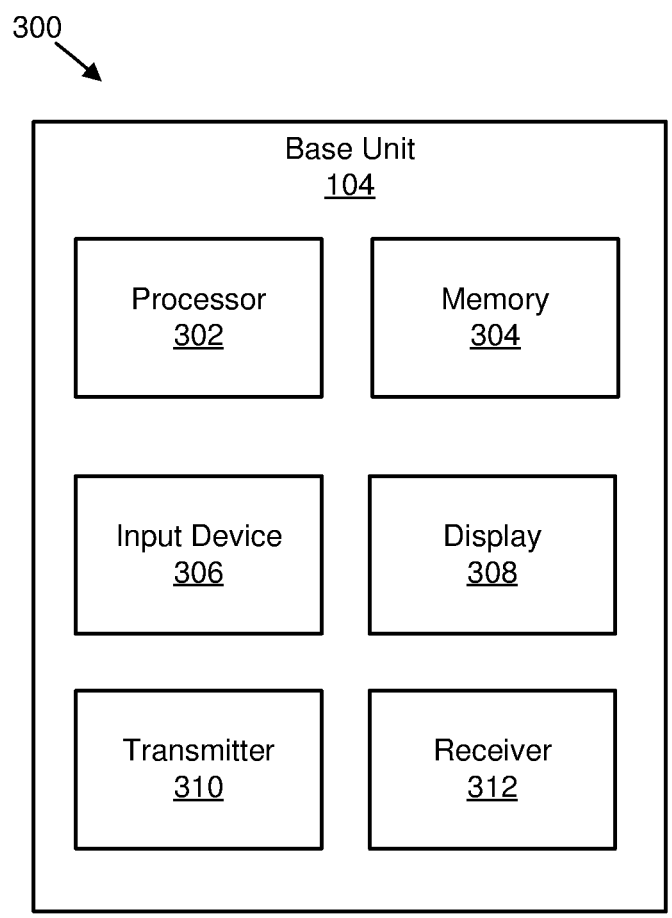
FIG. 3 is a schematic block diagram illustrating one embodiment of an apparatus that may be used for receiving an indication for a transport block.

FIG. 3 depicts one embodiment of an apparatus 300 that may be used for receiving an indication for a transport block. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the transmitter 310 may be used to transmit system information. In various embodiments, the receiver 312 may be used to receive, in response to a size of a transport block being greater than a predetermined threshold, an indication that identifies whether a medium access control control element is at an end of the transport block. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 5:
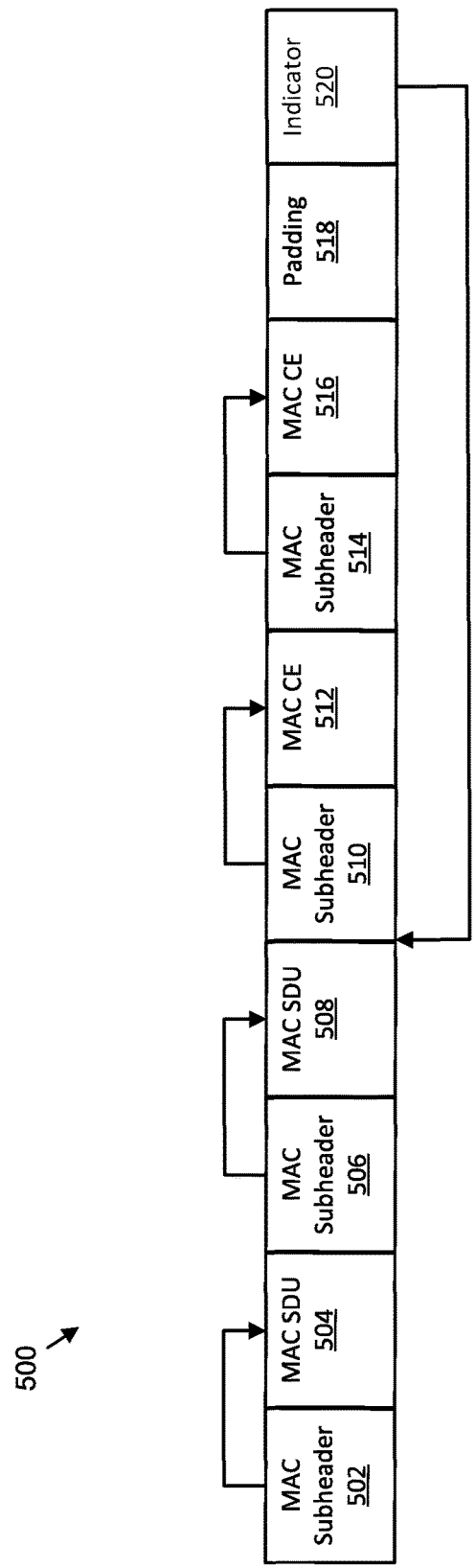
FIG. 5 is a schematic block diagram illustrating another embodiment of a transport block.
Figure 6:
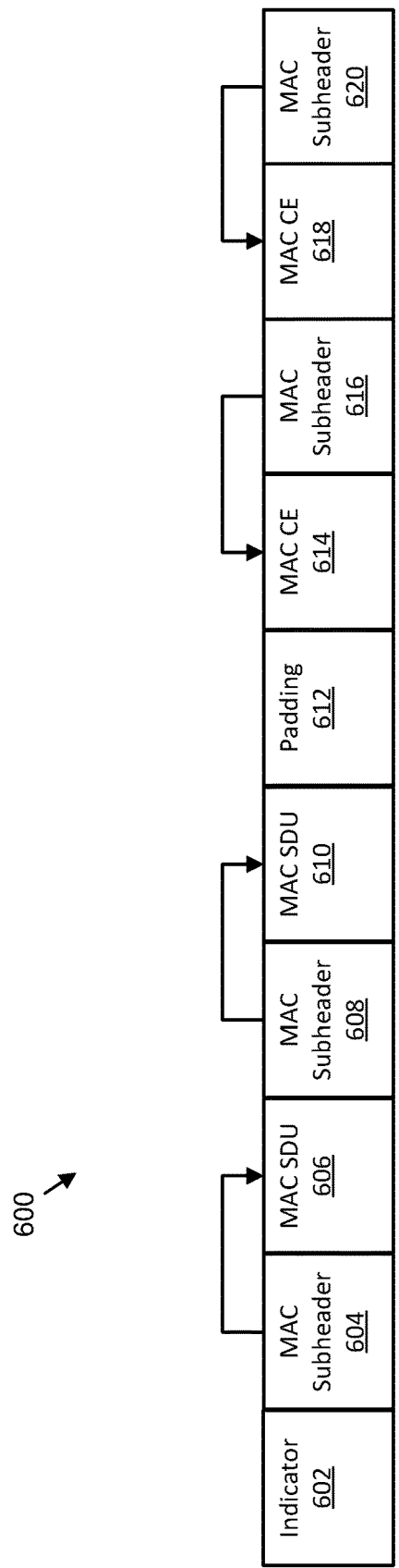
FIG. 6 is a schematic block diagram illustrating a further embodiment of a transport block.

In one embodiment, a base unit 104 may configure a remote unit 102 with a threshold (e.g., predetermined threshold). In various embodiments, this threshold may specify a transport block ("TB") size in bits, bytes, kilobytes, megabytes, and so forth. In some embodiments, a remote unit 102, or a MAC layer used for generating a MAC protocol data unit ("PDU") (e.g., TB), may compare the TB size, as indicated by a physical layer according to a corresponding UL grant, with the configured threshold. In certain embodiments in which the size of the to be generated TB is greater than the configured threshold, the remote unit 102 may use a MAC PDU format that enables the receiver (e.g., base unit 104) to quickly retrieve the content of the MAC CE without having to first process all MAC service data unit ("SDU") conveyed in the TB (e.g., by parsing the TB from the end), as illustrated in FIGS. 5 and 6. In various embodiments in which the size of the to be generated TB is smaller than or equal to the configured threshold, the remote unit 102 may use a MAC PDU format that does not enable the receiver (e.g., base unit 104) to parse the MAC CEs first, as illustrated in FIG. 4.

Figure 4:
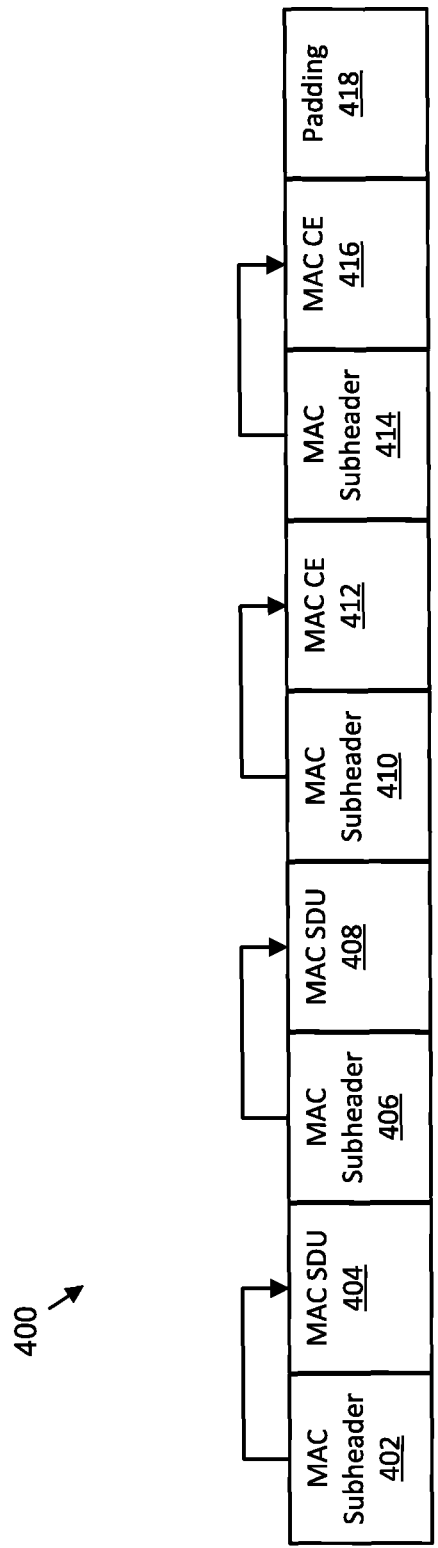
FIG. 4 is a schematic block diagram illustrating one embodiment of a transport block.

FIG. 4 is a schematic block diagram illustrating one embodiment of a transport block 400 that a remote unit 102 may use in response to a size of the TB 400 being smaller than or equal to a configured threshold. As illustrated, the transport block 400 includes a first MAC subheader 402, a first MAC SDU 404 corresponding to the first MAC subheader 402, a second MAC subheader 406, a second MAC SDU 408 corresponding to the second MAC subheader 406, a third MAC subheader 410, a first MAC CE 412 corresponding to the third MAC subheader 410, a fourth MAC subheader 414, a second MAC CE 416 corresponding to the fourth MAC subheader 414, and padding 418. The transport block 400 does not include an indication that identifies whether a MAC CE is at an end of the transport block 400.

In the transport block 400, MAC subheaders 402, 406, 410, and 414 are placed immediately in front of the corresponding MAC SDUs and MAC CEs. The first and second MAC CEs 412 and 416 are placed at the end of the transport block 400, after any MAC SDUs (e.g., the first and second MAC SDUs 404 and 408) but before the padding 418. In other embodiments, a remote unit 102 may use a MAC PDU format in which MAC CEs are placed before any MAC SDUs (e.g., at the beginning of a transport block).

FIG. 5 is a schematic block diagram illustrating another embodiment of a transport block 500. The format of the transport block 500 may be used by a remote unit 102 in response to a size of the TB 500 being greater than a configured threshold. As illustrated, the transport block 500 includes a first MAC subheader 502, a first MAC SDU 504 corresponding to the first MAC subheader 502, a second MAC subheader 506, a second MAC SDU 508 corresponding to the second MAC subheader 506, a third MAC subheader 510, a first MAC CE 512 corresponding to the third MAC subheader 510, a fourth MAC subheader 514, a second MAC CE 516 corresponding to the fourth MAC subheader 514, padding 518, and an indicator 520. In some embodiments, the indicator 520 provides an indication that identifies whether a MAC CE is at an end of the transport block 500. In various embodiments, the indicator 520 identifies a location in the transport block that is a beginning location of the MAC CEs (e.g., the beginning of the third MAC subheader 510 that is before the first MAC CE 512). In some embodiments, the indicator 520 may indicate that there are no MAC CEs (e.g., with the indicator 520 set to zero).

In certain embodiments, the indicator 520 is transmitted at the end of the TB 500 after any MAC SDUs, MAC CEs (if any) and after padding (if any). Furthermore, MAC CEs are placed at the end of the TB 500 (e.g., after all the MAC SDUs). In various embodiments, a receiver (e.g., base unit 104) may immediately retrieve the content of the MAC CEs by checking the indicator 520 first.

FIG. 6 is a schematic block diagram illustrating a further embodiment of a transport block 600. The format of the transport block 600 may be used by a remote unit 102 in response to a size of the TB 600 being greater than a configured threshold. As illustrated, the transport block 600 includes an indicator 602, a first MAC subheader 604, a first MAC SDU 606 corresponding to the first MAC subheader 604, a second MAC subheader 608, a second MAC SDU 610 corresponding to the second MAC subheader 608, padding 612, a first MAC CE 614, a third MAC subheader 616 corresponding to the first MAC CE 614, a second MAC CE 618, and a fourth MAC subheader 620 corresponding to the second MAC CE 618. In some embodiments, the indicator 602 provides an indication that identifies whether a MAC CE is at an end of the transport block 600 (e.g., with the indicator 602 set to one). In various embodiments, the indicator 602 may indicate whether the TB 600 includes MAC CEs. In certain embodiments, the indicator 602 may indicate that there are no MAC CEs (e.g., with the indicator 602 set to zero).

In some embodiments, the indicator 602 is transmitted at the beginning of the TB 600 before any MAC SDUs. Furthermore, MAC CEs are placed at the end of the TB 600 (e.g., after all the MAC SDUs). To facilitate a receiver (e.g., base unit 104) parsing the TB 600 from the end, each MAC subheaders for a corresponding MAC CE is placed closer to the end of the TB 600 than the corresponding MAC CE (e.g., MAC subheader corresponding to a MAC CE is placed immediately after the MAC CE).

In various embodiments, the threshold (e.g., value, predetermined threshold) may be given by a specification. In some embodiments, the threshold may be provided to a remote unit 102 within system information transmitted from a base unit 104.

As described herein, extra overhead (e.g., an indicator, an indication) for small TB sizes may be avoided. This may be important for TB that are small because the relative overhead is significant. Moreover, retrieving MAC CEs immediately from a TB may provide benefits for large TB s by the MAC CEs being processed before other portions of the TB.

In certain embodiments, a MAC subheader may include a length field that indicates a length of its corresponding MAC SDU or the MAC CE. In some embodiments, the length field may indicate the length in bits or bytes. In various embodiments, there may be one length field per MAC subheader except for subheaders corresponding to fixed-sized MAC CEs. In one embodiment, padding may not be explicitly indicated by a corresponding MAC subheader. In various embodiments, MAC PDU subheaders may correspond only to either a MAC SDU or a MAC CE. In such embodiments, padding may be implicity identified and/or derived by a remote unit 102. In one embodiment, padding is placed after any MAC SDUs and before any MAC CEs as shown in FIG. 6. Such an embodiment may apply to a MAC PDU format that enables parsing the MAC PDU from the end.

Figure 7:
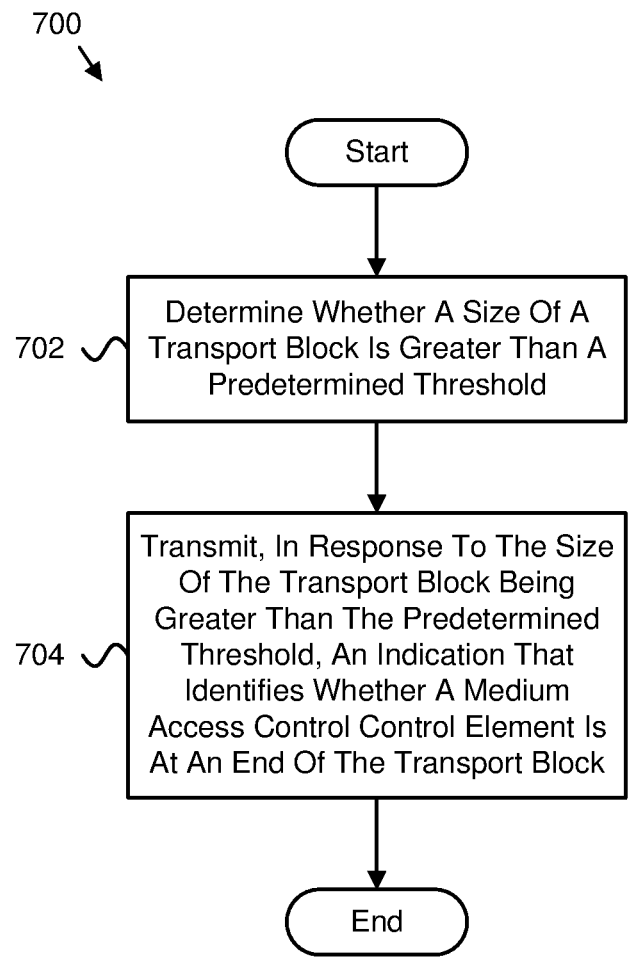
FIG. 7 is a schematic flow chart diagram illustrating one embodiment of a method for transmitting an indication for a transport block.

FIG. 7 is a schematic flow chart diagram illustrating one embodiment of a method 700 for transmitting an indication for a transport block. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

The method 700 may include determining 702 whether a size of a transport block is greater than a predetermined threshold. In various embodiments, the method 700 includes transmitting 704, in response to the size of the transport block being greater than the predetermined threshold, an indication that identifies whether a medium access control element is at an end of the transport block.

In one embodiment, the transport block includes a medium access control protocol data unit. In certain embodiments, the indication identifies a location in the transport block. In various embodiments, the location is a beginning location of medium access control control elements. In some embodiments, the beginning location of medium access control control elements is positioned after medium access control service data units in the transport block.

In certain embodiments, the method 700 includes receiving a message indicating the predetermined threshold. In some embodiments, the message is a system information message. In various embodiments, the predetermined threshold is determined based on a specification. In one embodiment, the method 700 includes transmitting the indication at a beginning of the transport block. In certain embodiments, the method 700 includes transmitting the indication at an end of the transport block. In some embodiments, medium access control subheaders are positioned before medium access control control elements in the transport block. In various embodiments, medium access control subheaders are positioned after medium access control control elements in the transport block.

In one embodiment, the method 700 includes, in response to the size of the transport block being less than the predetermined threshold, not transmitting the indication. In certain embodiments, medium access control headers include a length field that indicates a length of information corresponding to a respective medium access control subheader. In various embodiments, a length of padding is not indicated by a corresponding medium access control subheader. In some embodiments, the transport block includes padding between medium access control service data units and medium access control control elements.

Figure 8:
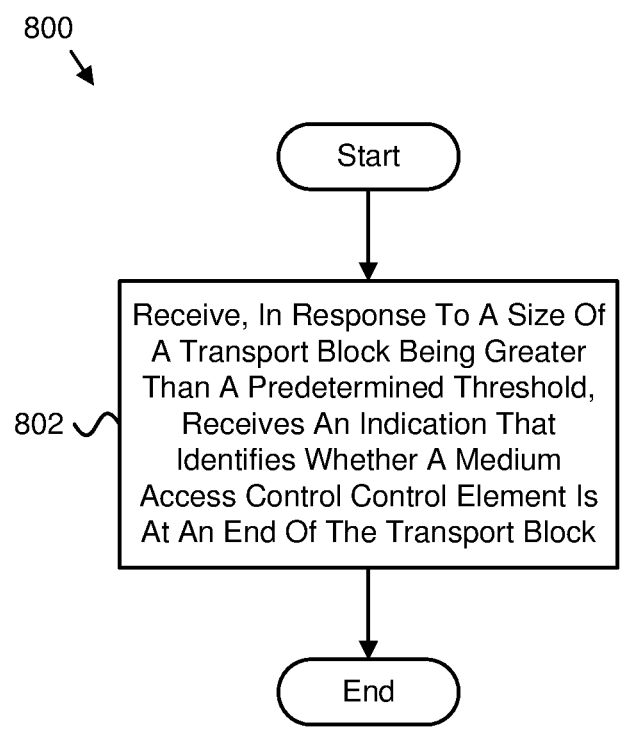
FIG. 8 is a schematic flow chart diagram illustrating one embodiment of a method for receiving an indication for a transport block.

FIG. 8 is a schematic flow chart diagram illustrating one embodiment of a method 800 for receiving an indication for a transport block. In some embodiments, the method 800 is performed by an apparatus, such as the base unit 104. In certain embodiments, the method 800 may be performed by a processor executing program code, for example, a microcontroller, a microprocessor, a CPU, a GPU, an auxiliary processing unit, a FPGA, or the like.

The method 800 may include receiving 802, in response to a size of a transport block being greater than a predetermined threshold, an indication that identifies whether a medium access control control element is at an end of the transport block.

In one embodiment, the transport block includes a medium access control protocol data unit. In certain embodiments, the indication identifies a location in the transport block. In various embodiments, the location is a beginning location of medium access control control elements. In some embodiments, the beginning location of medium access control control elements is positioned after medium access control service data units in the transport block.

In certain embodiments, the method 800 includes transmitting a message indicating the predetermined threshold. In some embodiments, the message is a system information message. In various embodiments, the predetermined threshold is determined based on a specification. In one embodiment, the method 800 includes receiving the indication at a beginning of the transport block. In certain embodiments, the method 800 includes receiving the indication at an end of the transport block. In some embodiments, medium access control subheaders are positioned before medium access control control elements in the transport block. In various embodiments, medium access control subheaders are positioned after medium access control control elements in the transport block.

In one embodiment, the method 800 includes, in response to the size of the transport block being less than the predetermined threshold, not receiving the indication. In certain embodiments, medium access control headers include a length field that indicates a length of information corresponding to a respective medium access control subheader. In various embodiments, a length of padding is not indicated by a corresponding medium access control subheader. In some embodiments, the transport block includes padding between medium access control service data units and medium access control control elements.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a processor that determines whether a size of a transport block is greater than a predetermined threshold; and
a transmitter that:
in response to determining that the size of the transport block is greater than the predetermined threshold, transmits a binary indicator that identifies whether a medium access control control element is at an end of the transport block, wherein the binary indicator is transmitted outside of any medium access control subheaders; and
in response to determining that the size of the transport block is less than the predetermined threshold, does not transmit the binary indicator.

2. The apparatus of claim 1, wherein the transport block comprises a medium access control protocol data unit.

3. The apparatus of claim 1, wherein the binary indicator identifies a location in the transport block.

4. The apparatus of claim 3, wherein the location is a beginning location of medium access control control elements.

5. The apparatus of claim 4, wherein the beginning location of medium access control control elements is positioned after medium access control service data units in the transport block.

6. The apparatus of claim 1, further comprising a receiver that receives a message indicating the predetermined threshold.

7. The apparatus of claim 6, wherein the message is a system information message.

8. The apparatus of claim 1, wherein the predetermined threshold is determined based on a specification.

9. The apparatus of claim 1, wherein the transmitter transmits the binary indicator at a beginning of the transport block.

10. The apparatus of claim 1, wherein the transmitter transmits the binary indicator at an end of the transport block.

11. The apparatus of claim 1, wherein medium access control subheaders are positioned before medium access control control elements in the transport block.

12. The apparatus of claim 1, wherein medium access control subheaders are positioned after medium access control control elements in the transport block.

13. The apparatus of claim 1, wherein the transmitter, in response to the size of the transport block being less than the predetermined threshold, does not transmit the binary indicator.

14. The apparatus of claim 1, wherein medium access control headers comprise a length field that indicates a length of information corresponding to a respective medium access control subheader.

15. The apparatus of claim 14, wherein a length of padding is not indicated by a corresponding medium access control subheader.

16. The apparatus of claim 1, wherein the transport block comprises padding between medium access control service data units and medium access control control elements.

17. A method comprising:
determining whether a size of a transport block is greater than a predetermined threshold;
in response to determining that the size of the transport block is greater than the predetermined threshold, transmitting a binary indicator that identifies whether a medium access control control element is at an end of the transport block, wherein the binary indicator is transmitted outside of any medium access control subheaders; and
in response to determining that the size of the transport block is less than the predetermined threshold, not transmitting the binary indicator.

* * * * *